(12) United States Patent
Franke et al.

(10) Patent No.: US 8,078,319 B2
(45) Date of Patent: Dec. 13, 2011

(54) HIERARCHICAL CONTINGENCY MANAGEMENT SYSTEM FOR MISSION PLANNERS

(75) Inventors: Jerry L. Franke, Voorhees, NJ (US); Stephen M. Jameson, Wilmington, DE (US); Rosemary D. Paradis, Vestal, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1451 days.

(21) Appl. No.: 11/059,286

(22) Filed: Feb. 16, 2005

(65) Prior Publication Data
US 2011/0184604 A1  Jul. 28, 2011

(51) Int. Cl.
G06F 17/00 (2006.01)
(52) U.S. Cl. .............................. 700/248; 701/1; 701/23
(58) Field of Classification Search .................. 700/245, 700/247, 248, 250, 253, 254; 701/4, 23, 701/36, 202, 207, 208, 209, 210; 703/8, 703/17; 901/1; 244/76 R
See application file for complete search history.

(56) References Cited

U.S. PATENT DOCUMENTS

| | | | |
|---|---|---|---|
| 6,122,572 A * | 9/2000 | Yavnai ............................ 701/23 |
| 6,672,534 B2 | 1/2004 | Harding et al. | |
| 6,687,606 B1 | 2/2004 | Moitra et al. | |
| 6,718,261 B2 | 4/2004 | Mattheyses et al. | |
| 6,725,152 B2 | 4/2004 | Moitra et al. | |
| 2003/0158744 A1 | 8/2003 | Moitra et al. | |
| 2003/0213358 A1 | 11/2003 | Harding | |
| 2003/0233245 A1 | 12/2003 | Zemore | |
| 2004/0007121 A1 | 1/2004 | Graves et al. | |
| 2004/0024490 A1* | 2/2004 | McLurkin et al. ............. 700/245 |
| 2004/0030448 A1* | 2/2004 | Solomon ........................ 700/245 |
| 2005/0004723 A1* | 1/2005 | Duggan et al. .................. 701/24 |
| 2005/0251291 A1* | 11/2005 | Solomon ........................ 700/245 |
| 2005/0288819 A1* | 12/2005 | de Guzman .................... 700/245 |

* cited by examiner

*Primary Examiner* — Khoi Tran
*Assistant Examiner* — Spencer Patton
(74) *Attorney, Agent, or Firm* — Tarolli, Sundheim, Covell & Tummino LLP

(57) ABSTRACT

A system controls a team of vehicles. The system includes a plan dependency identifier, a contingency monitor, and an alert formulator. The plan dependency identifier analyzes a mission plan and identifies mission constraints of the mission plan. The contingency monitor continuously reviews execution of the mission plan for violations of the mission constraints. The alert formulator determines whether a part of the mission plan is threatened by a violation of one of the mission constraints.

10 Claims, 5 Drawing Sheets

HIERARCHICAL CONTINGENCY MANAGEMENT SYSTEM FOR MISSION PLANNERS

FIELD OF THE INVENTION

The present invention relates to a system for mission planning of unmanned vehicles and, more particularly, to a system for maintaining autonomous command and control of a team of unmanned vehicles in the presence of unexpected events, or contingencies.

BACKGROUND OF THE INVENTION

For many situations, the best protection against unexpected events is to have a good plan in place and to be ready to use it. Conventional contingency management systems usually are organized by Threat Identification, Risk Assessment, and Planning Prioritization; Review and Development of the Plan; Simulation Training of Plan Execution; Response to an Event; Management of Plan Execution; Response to an Event; Recovery and Operation Resumption; and Disengagement from Contingent Operation.

Threat Identification, Risk Assessment, and Planning Prioritization typically includes the identification and assessment of threats and the prioritization of event planning efforts (i.e., planning for a worst case scenario, etc.). In a less dynamic environment, a controllable scope of the plan may be defined.

Review and Development of the Plan typically is a review of the existing plan and the development of a new plan defined by the project scope. The event that will trigger a plan's implementation may also be determined.

Simulation Training of Plan Execution, once the plan is finalized, ensures smooth and successful implementation by training for implementation of the contingency plan. Response to an Event, when a contingency occurs, may require a strong system of threat monitoring, emergency notification, and command and control systems. A contingency plan may be implemented when a trigger event occurs. Contingency plans may be put into effect anytime to prevent a service disruption. The objective of a plan execution step is the smooth and efficient planning of the contingency plan. A strong command and control system may ensure that the plan activation and monitoring is carried out in an organized and controlled manner.

Management of Plan Execution typically ensures rapid oversight and rapid decision-making. Management includes factors such as event information, current mission plan, and deployed resources.

Response to an Event, when an event occurs, provides real-time tracking of events and a response of resources for the event. The potential for many simultaneous events may require a robust data management system.

Recovery and Operation Resumption provides business resumption and recovery planning by the contingency plan. Disengagement from Contingent Operation provides determination of trigger events for ending a contingency mode of operation. Test plans and scripts for these operations may be predetermined.

It is difficult, if not impossible, to plan for contingencies ahead of time and have a defined backup plan. The set of contingencies may only be described by broad classes and not by a finite set of discrete occurrences. Thus it is not possible to develop a detailed backup plan for each possible contingency. Backup plans typically need to be created on the fly and implemented at the right level of detail in the plan hierarchy for the plan to continue seamlessly. This is not conventionally the case.

Conventional mission planning methods rely heavily on human operation to prepare plans and monitor plan execution. Tools which attempt automated planning using traditional models (i.e., batch processes, sense and act, etc.) typically require long advance preparation times for determination of the plan, based on static or predicted feedback. There is thus limited ability to handle complex, large dimension problems and to quickly refine or replan based on unfolding dynamic events that will be the norm rather than the exception for most urban operations. A dynamic, self-planning contingency management system is desirable to effectively execute a mission plan in a warfare environment that is dynamic and constantly changing.

SUMMARY OF THE INVENTION

A system in accordance with the present invention controls a team of vehicles. The system includes a plan dependency identifier, a contingency monitor, and an alert formulator. The plan dependency identifier analyzes a mission plan and identifies mission constraints of the mission plan. The contingency monitor continuously reviews execution of the mission plan for violations of the mission constraints. The alert formulator determines whether a part of the mission plan is threatened by a violation of one of the mission constraints.

Another system in accordance with the present invention interactively controls a team of vehicles executing a mission plan. The system includes a mission planner, a contingency manager, a sensor data manager, and a platform execution manager. The mission planner determines optimal resource allocation and tasking in response to requests by users of the result of the mission plan. The mission planner modifies the mission plan for optimal execution of the mission plan. The contingency manager monitors status of execution of the mission plan. The sensor data manager distributes sensor data to the users. The platform execution manager evaluates and simulates a mission plan.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF EXAMPLE EMBODIMENTS

Figure 1:
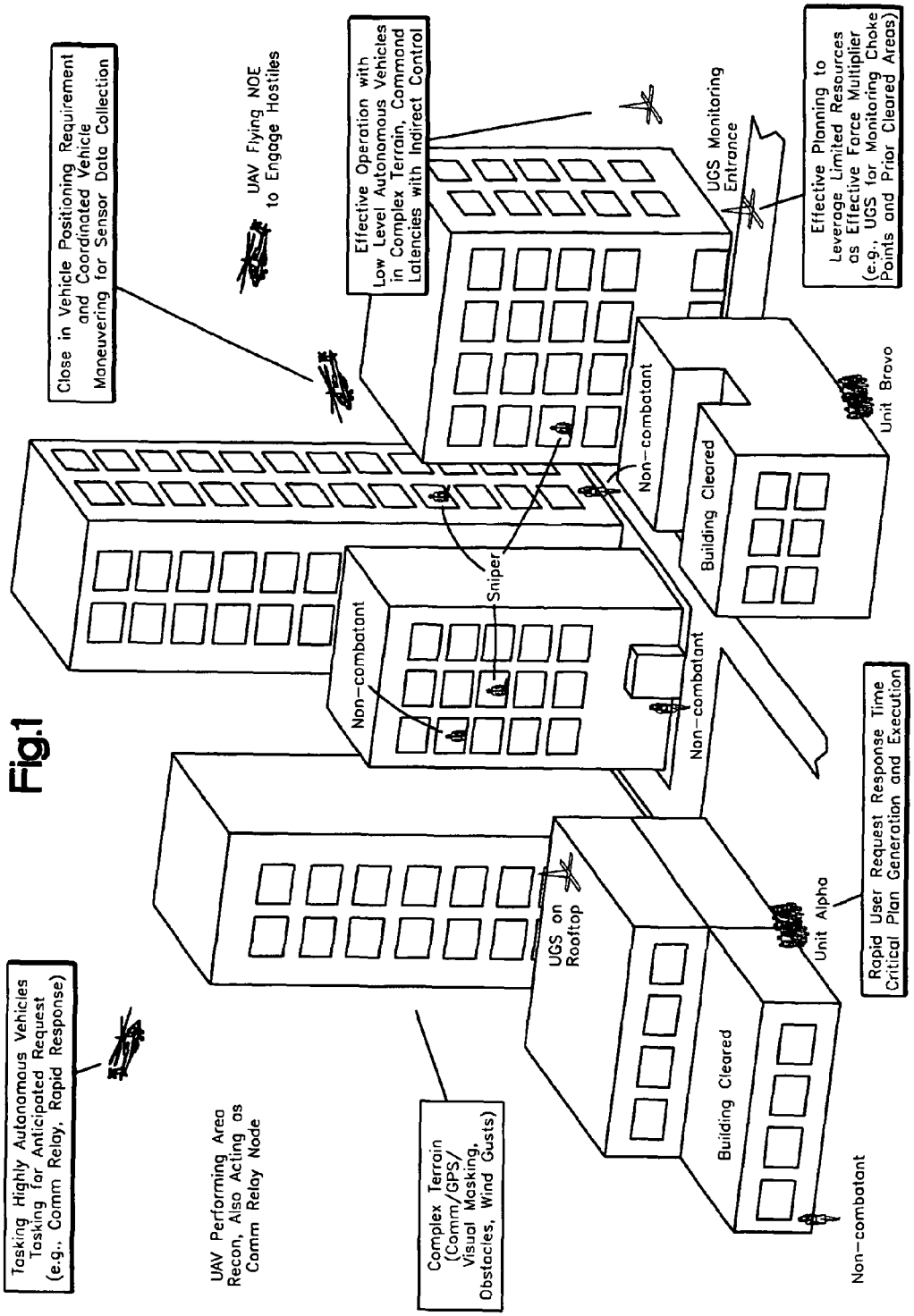
FIG. 1 is a schematic representation of an environment in which a system in accordance with the present invention may be utilized.

A system in accordance with the present invention implements state-of-the art components for cognitive reasoning and combines these components into a hierarchical planning system that may dissect a plan or separate mission components for sub-tasks that are less complex. These subtasks may then be planned based on various techniques (i.e., deliberative method, swarming method, etc.) to execute a mission plan for each unmanned vehicle of a team of unmanned vehicles.

In order to provide autonomous command and control for a team of unmanned vehicles, a system in accordance with the present invention includes a number of synergistic components designed to provide accurate and efficient resource allocation and dynamic mission planning capabilities for unmanned vehicles with varying levels of autonomy. The system may also adapt the plan and the team's execution of the plan in the event of unexpected events, such as changes to the mission plan, loss of one or more unmanned vehicles, failure of a subsystem of one or more unmanned vehicles, change to environmental conditions, an unexpected appearance or disappearance of threat, etc.

The system monitors execution of a mission plan by a team of autonomous vehicles. In the event of an unplanned event, the system may update and change the mission plan to overcome the unplanned event. The system may autonomously monitor the status of an execution of the mission plan from the health and status of each individual unmanned vehicle, the status of each individual plan, and the status of an overall, collaborative mission plan to ensure proper execution. The system provides flexibility to the mission plan and allows successful execution of the mission plan even under circumstances that would conventionally result in termination of the mission or loss of unmanned vehicles.

The system may control autonomous vehicles and operate in a desert, an ocean, or an urban environment, each having unique characteristics. Understanding the challenges of each environment, in particular an urban environment, may include recognition of obstacles such as high-rise buildings, friendly/hostile forces, etc. Environmental considerations may also be considered while planning a mission. Some unique constraints to an urban environment may be proximity of obstacles and time constraints for enabling rapid decision-making and response planning for certain tasks.

Because of potential danger to humans in a hazardous environment, an autonomous vehicle may enter an environment. An autonomous vehicle may thus survey the environment and report back to a commander or decision maker the condition of the environment. Multiple autonomous vehicles, or teams of vehicles, may also perform this task to obtain a maximum amount of information.

The particular environment, number of operators, and number of unmanned vehicles may increase the complexity of a situation. This complexity greatly increases the range of potential unplanned events and likelihood of occurrences of such events. As a result, modifications and changes to the plan, as well as task modification, may be necessary to achieve the mission objective.

A contingency management system in accordance with the present invention may monitor and update a mission plan and also schedule transfer of information, thereby partially or completely mitigating the effect of events that may be catastrophic to the overall mission plan. The system may capture changes and update/optimize the mission plan that will achieve the mission objectives.

Military operations in hostile and constantly changing environments, more common as battle theatres, are complex and dangerous for a warfighter. The flexible mission planning system accounts for such environments.

Key goals for the system may be: (1) improvement of support for the warfighters in the environment; (2) providing efficient means for commanders to plan missions; and (3) providing commanders with a capability for plan monitoring and real-time plan execution refinements.

The mission planning and control system for unmanned autonomous vehicles may provide a tool for reducing the risk to, and improving the effectiveness of, forces operating in any environment, including the more complex urban environment. FIG. 1 shows an example environment with some of the challenges of an urban environment. The callout boxes in FIG. 1 highlight the planning and control challenges associated with an urban Reconnaissance, Surveillance, and Target Acquisition (RSTA).

An example mission may comprise a number of human units and a warfighter. Typically, the human units encounter a high risk of exposure to sniper fire The environment may be an Intercity Urban Terrain Zone (IUTZ). The objective of the human units is to clear the zone of hostiles. The warfighter may request current imagery in advance of its intended route, with particular interest in rooftop and open windows with line of sight to a near term route. The warfighter may also request updates on which buildings have been cleared in a local area. The human units may have PUMA UAV (Hand-Launch Pointer with side-scan camera) collecting imagery of building windows. For, example, the PUMA may be a model constructed by AeroVironment, Inc.

The human units may further receive GPS and sensor information from a Silver Fox. For example, the Silver Fox may be a model constructed by Advanced Ceramics Research, Inc. The human units also may deposit Unattended Ground Sensors (UGS) at key entrances to buildings for monitoring access points to already cleared buildings as well as at corners of rooftops with good lines of visibility to neighboring buildings and intersections. An Unmanned Air Vehicle (UAV) team of unmanned vehicles may sweep the IUTZ to provide wider area coverage, communication relay, and rapid response to hostilities or other changes to the IUTZ.

The mission planning and control system for unmanned autonomous vehicles may provide control over a wide range of unmanned vehicles, as well as interacting in a teaming relationship with human warfighters who also complete tasks to meet mission objectives. The system may be adaptive (i.e., contingency management, etc.), but also flexible enough to consider the different capabilities of the unmanned vehicles and the human units.

For low-autonomy unmanned vehicles, the system may compensate for lack of on-board situational awareness and embedded planning capability on these vehicles by designating them as obstacles or collision hazards to be avoided by the other, more capable aircraft in the IUTZ. The system may respond to a large number of user requests, along with scheduling, with optimal usage of a large pool of resources. This planning situation creates a complexity challenge for time-critical responses.

The availability of multiple RSTA assets enables the system to maximize synergy among a team of unmanned vehicles in achieving results of higher quality, greater reliability, and/or greater speed than would be available by independently tasking of the same set of unmanned vehicles. This system may task a team of multiple autonomous unmanned vehicles having varying levels of autonomy.

The system may task heterogeneous unmanned vehicles thereby exploiting synergy among diverse vehicle capabilities. The system may form/reform teams dynamically thereby allowing continuity of mission plan execution in the face of changing assets and resources.

The planning and control system in accordance with the present invention provides dynamic response to changes in the make-up of the unmanned vehicle teams, human units in the area, and/or the mission objective. The system is dedicated to contingency management and monitors the 'heartbeat' of a mission plan by responding to fluctuations in mission plan execution with an improved mission plan.

The system is hierarchical in nature, decomposing high level mission goals, such as "Find the sniper in the NE area of the city" into lower level route planning, communication relay, and sensor sub-task plans. Therefore, the transfer from the system decision and control logic to a platform/control station's embedded planning (if any) and control logic may be executed at any level of the hierarchy. This allows the system to task unmanned vehicles with varying levels of autonomy from high levels of autonomy down to vehicles with simple waypoint flight control.

By having tasks executed at different levels on a hierarchy, a contingency manager in accordance with the present invention may adapt easily to unexpected changes by modifying only the deepest nodes on the hierarchy that would affect the modification. The Contingency Manager (CM) may monitor plan execution and initiate plan refinement/replanning that is necessitated by unplanned events or faults.

Figure 2:
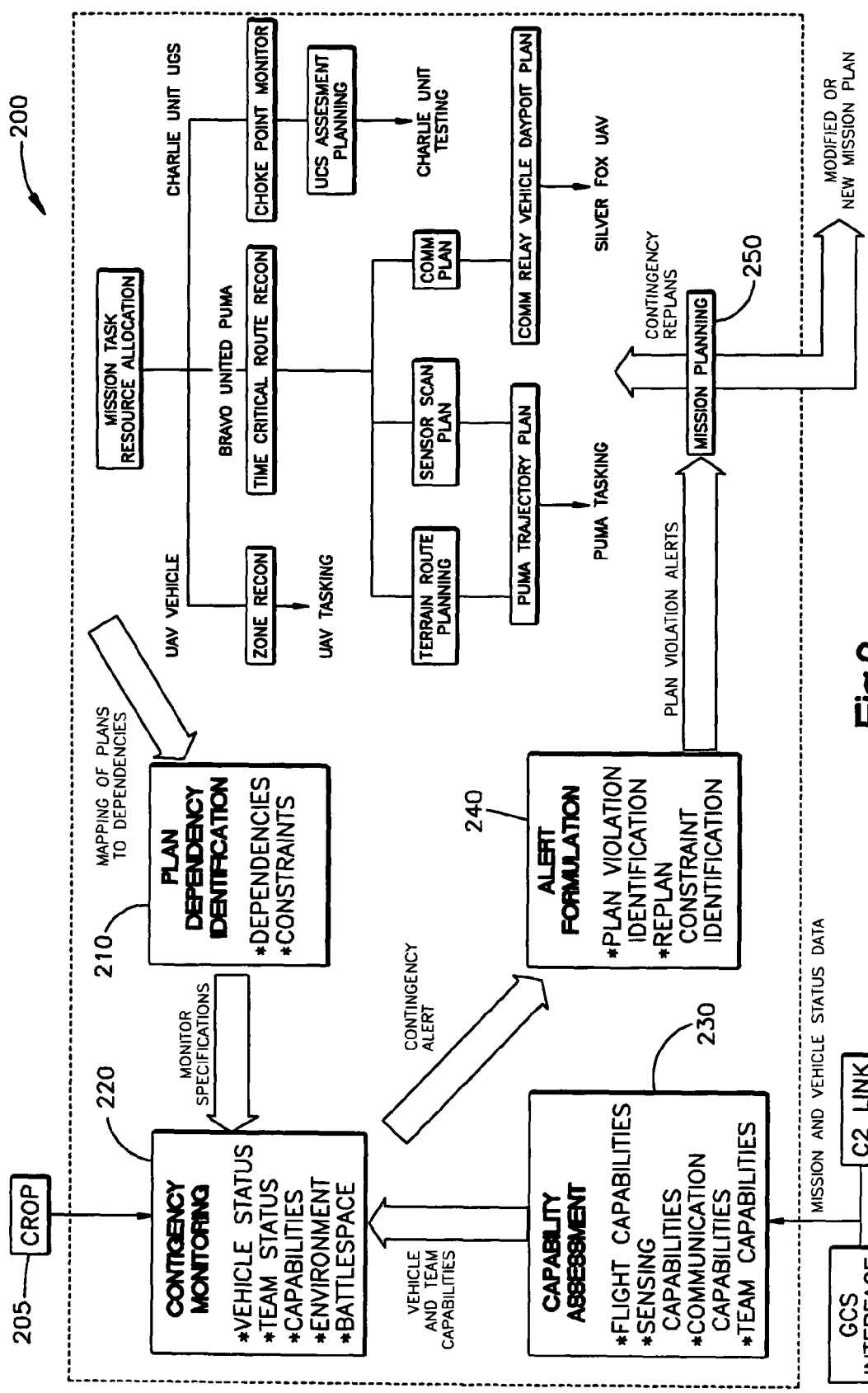
FIG. 2 is a schematic representation of an example system in accordance with the present invention.

FIG. 2 depicts the flow of events for an example Contingency Manager 200 in accordance with the present invention. Firstly, a mission plan with a hierarchical structure may be developed. When a new plan is created or a plan is modified, a mission planner may notify the Contingency Manager 200 of the new or modified plan. This plan may include goals or objectives of the mission plan.

A Plan Dependency Identification module 210 of the Contingency Manager 200 may analyze the mission plan to identify dependencies/constraints and dynamically create a monitor 210 for each dependency/constraint. A Contingency Monitoring module 220 of the Contingency Manager 200 may use the monitors to continually check for violations of the dependencies and/or constraints. Plan dependencies and constraints may be mapped so that the Contingency Manager 200 is aware that some part of a task may have to change.

A Capability Assessment module 230 of the Contingency Manager 200 may identify flight capability, sensing capability, strike capability, and communication capability of the team and thereby determine whether the team may successfully complete the plan. Plan elements may have constraints and dependencies related to a wide variety of factors. Some factors may include Vehicle Status, Vehicle Capability, Team Status, Environment, and Battlespace.

Vehicle Status may be derived from information about an unmanned vehicle received directly from the unmanned vehicle, a control station, or over a C2 link. Vehicle Capability may represent a vehicle's capacity to perform functions required for mission execution, such as terrain, flight, sensing and communication. A capability may be derived from vehicle status information or received directly from an unmanned vehicle or control station with ability to report capability information.

Team Status may be combined information about the status of a team of unmanned vehicles. Environment may be data such as weather, wind, etc. This data may be derived from the Common Relevant Operational Picture (CROP) 205. Battlespace may be data related to hostile versus entities. This data may also be derived from the CROP 205.

The CROP 205 may be a representation of timely, fused, accurate, and relevant battlespace and environment information tailored to meet the requirements of a particular mission plan. Other inputs to the Contingency Manager 200 of the system may be the status and availability of the vehicles for the particular mission. The Contingency Manager 200 may also monitor the vehicle status, team status, changing vehicle or team capabilities, and changes in the environment and battlespace. The Capability Assessment module 230 of the Contingency Manager 200 may utilize failure notifications and other status information to derive vehicle and team capabilities, which support the Contingency Monitoring module 220.

When the Contingency Monitoring module 220 detects a violation of a dependency or constraint, an Alert Formulation module 240 of the Contingency Manager 200 may determine that a mission plan component is threatened by the violation. The Alert Formulation module 240 may then use any constraints on replanning due to such a contingency to send an alert to a Mission Planning module 250 of the Contingency Manager 200 so that the mission plan may be modified or a new plan generated.

Figure 3:
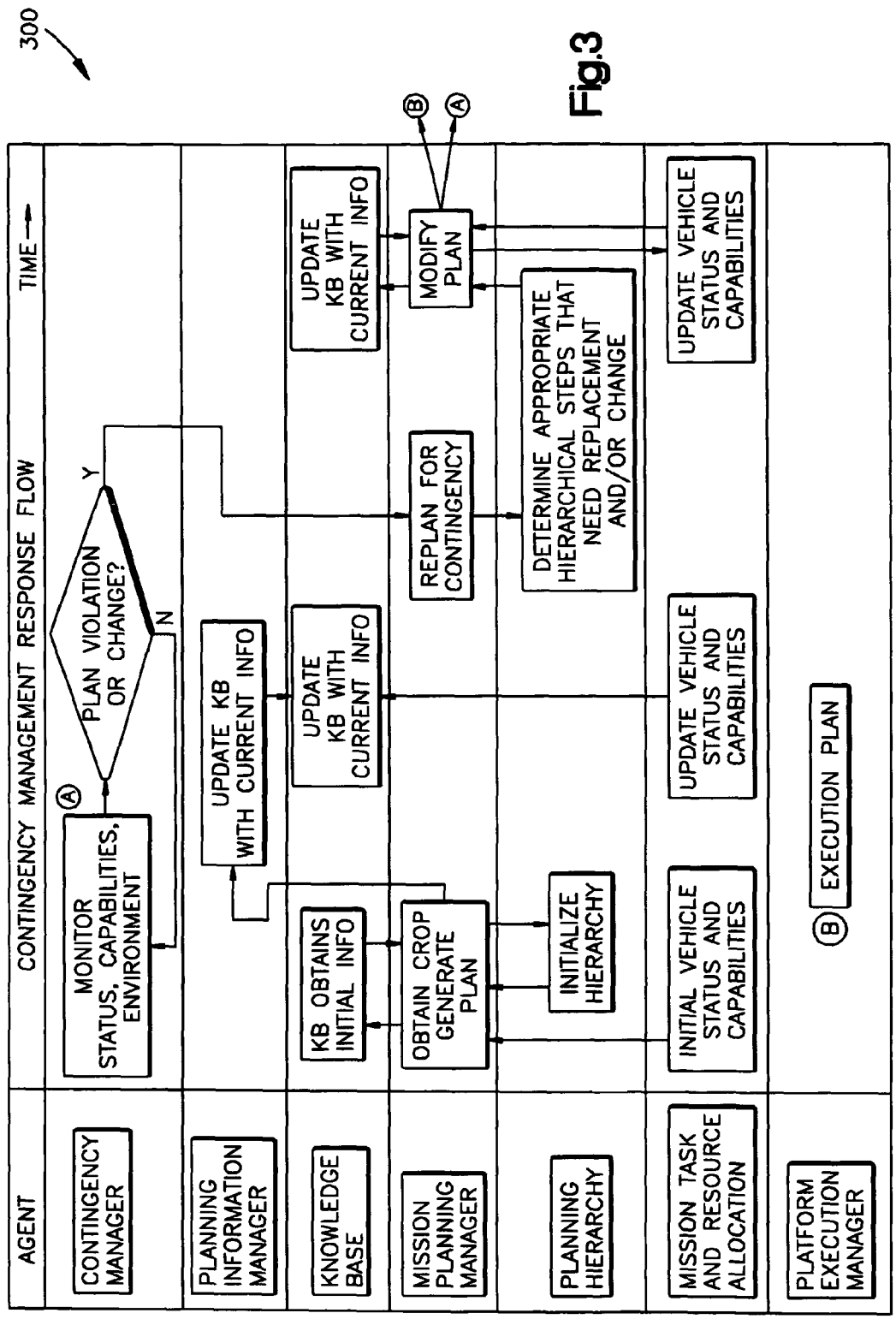
FIG. 3 is a schematic representation of an example of operation of the system of FIG. 2.

If an alert is generated, due to plan violation or replanning identifications, the Alert Formulation module 240 may present all information to the Mission Planning module 250 to identify aspects of the mission plan that should be modified and at what level this modification should take place. FIG. 3 shows an example step-by-step operation of an example Contingency Manager 300 in accordance with the present invention.

Figure 4:
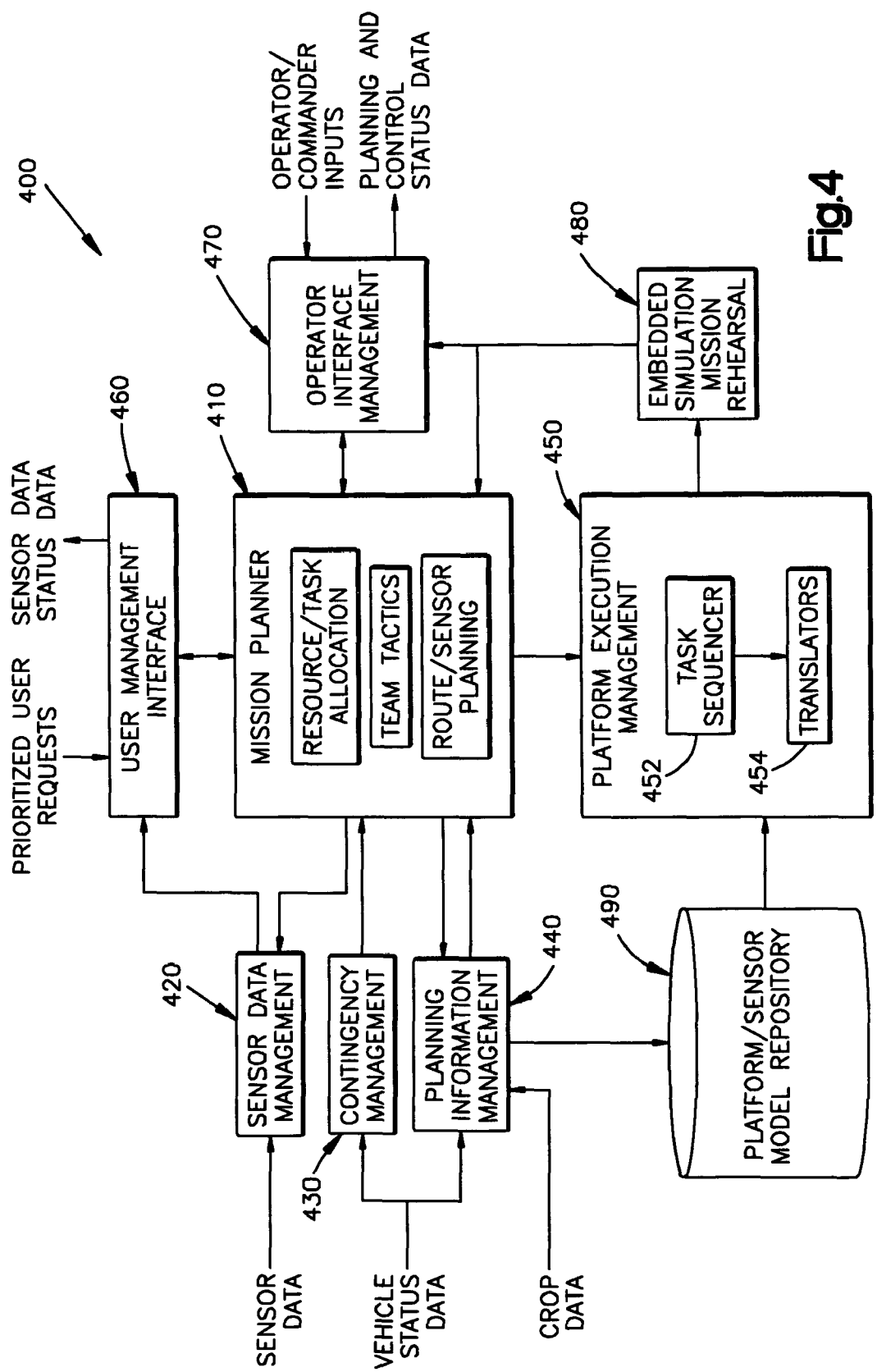
FIG. 4 is a schematic representation of another example system in accordance with the present invention.

In order to control a team of unmanned vehicles with varying levels of autonomy, an example system 400 in accordance with the present invention may include a number of synergistic functional components designed to provide accurate and efficient resource allocation and dynamic mission planning capability. As shown in FIG. 4, such components may include a Mission Planner 410, a Sensor Data Manager 420, a Contingency Manager 430, a Planning Information Manager 440, a Planning Execution Manager 450, a User Interface Manager 460, an Operator Interface Manager 470, an Embedded Simulator 480, a Platform/Sensor Model Repository 490, etc.

The Mission Planner 410 may determine an optimal resource allocation and tasking in response to asynchronous user requests. The Sensor Data Manager 420 may coordinate, schedule, and optimize the distribution of received sensor data to the various users in response to asynchronous user requests.

The Contingency Manager 430 may autonomously monitor the status of mission execution from the health and status of the individual vehicles, the status of individual plans, to the status of the collaborative mission plan. The Contingency Manager 430 may be the contingency manager 200 described in FIG. 2.

The Planning Information Manager 440 may extract information from actual mission plans, as well as external resources, and translate the information into a necessary format to be used by the other mission planning components. The Platform Execution Manager 450 may enable a planned mission to be evaluated, simulated, and detailed through tasking of various vehicle platforms. This may include the use of data from the Platform Modeling Repository 490, a Task Sequencer 452, a Vehicle Platform Translator 454, and links to the Embedded Simulator 480 for plan assessment and mission rehearsal.

The User Interface Manager 460 may provide the interface between the system 400 and an end user in the field. For example, multiple users may asynchronously task the system 400 for a variety of requests.

The Operator Interface Manager 470 may provide an interface between the system 400 and an operator. An operator may input a commander instructions and/or high-level mission constraints. Additionally, an operator may monitor execution of the mission plan and intercede at any level of the planning hierarchy, if desired.

The Embedded Simulator 480 may provide a realistic simulation model to evaluate candidate plans, produce performance metrics, and/or provide feedback to an operator and/or mission commander for plan refinement and mission rehearsal.

The Platform/Sensor Model Repository 490 may store realistic models used for various platforms and sensors in a mission environment. The Repository 490 may generally be populated from outside the system 400, but maintained within the system.

Figure 5:
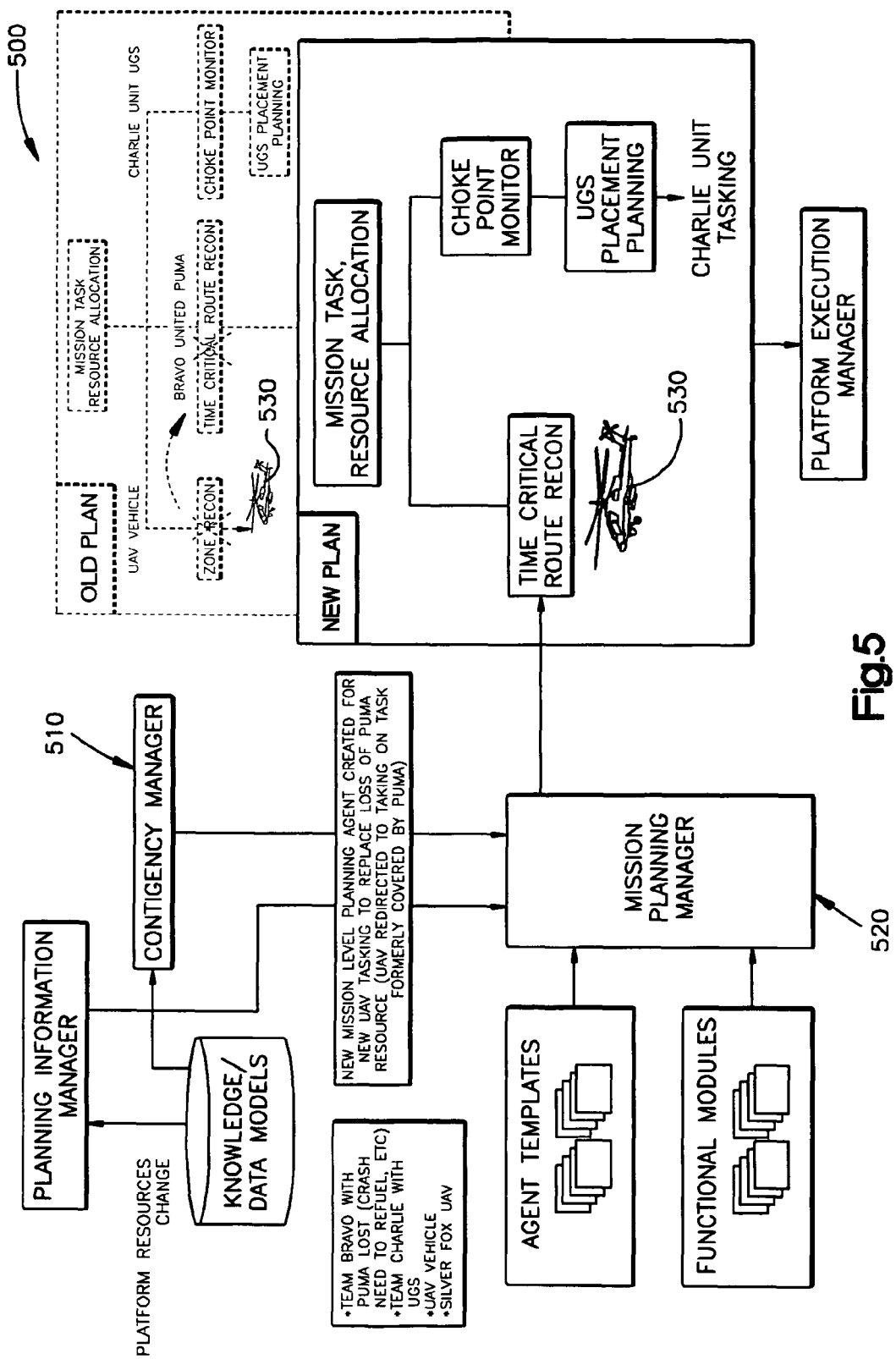
FIG. 5 is a schematic representation of still another example system in accordance with the present invention.

FIG. 5 shows another example system 500 for planning and controlling implementation of dynamic planning activity. Planning may be modified when the system 500 is alerted by a change in status. In the example of FIG. 5, a PUMA UAV 530 is alerted with a change in status. Another PUMA UAV 530 that was executing a time critical route reconnaissance in advance of a unit's intended path is lost, either through attrition or temporarily for refueling. This change in resource pool for the system 500 may result in a contingency manager 510 cueing a request for replan to a Mission Planning Manager 520. The Mission Planning Manager 520 may create a new resource and task allocation planning agent that may determine that a UAV vehicle performing a wider area less critical zone reconnaissance should be retasked to take over the time critical route reconnaissance.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A non-transitory computer readable medium containing executable instructions for controlling a team of vehicles, with each vehicle having an associated set of capabilities, said computer executable instructions comprising:
   a plan dependency identifier configured to analyze a mission plan and identify mission constraints of the mission plan;
   a contingency manager configured to continuously review execution of the mission plan for violations of the mission constraints, the contingency manager being configured to map tasks of the mission plan into an hierarchy such that a given task in a first layer of the hierarchy of tasks can have at least one component task in a second layer of the hierarchy;
   an alert formulator configured to determine whether a part of the mission plan is threatened by a loss of a first vehicle of the team of vehicles; and
   a mission planner configured to receive alerts from said alert formulator and modify only parts of the mission plan necessitated by the alerts, such that the mission planner generates a new mission plan comprising modified tasks and unmodified tasks.

2. The non-transitory computer readable medium as set forth in claim 1, the executable instructions further including a capability assessor configured to identify properties of the team of vehicles.

3. The non-transitory computer readable medium as set forth in claim 2 wherein said capability assessor receives failure notifications from the team of vehicles.

4. The non-transitory computer readable medium as set forth in claim 1, further comprising a platform execution manager configured to simulate a planned mission through tasking of a set of the team of vehicles.

5. The non-transitory computer readable medium as set forth in claim 4, wherein the platform execution manager is configured to provide a realistic simulation model to evaluate candidate plans from the mission planner and provide feedback to an operator for plan rehearsal.

6. A system for controlling a team of unmanned vehicles, said system comprising:
   the team of unmanned vehicles, each vehicle having an associated set of capabilities, such that the team of unmanned vehicles includes a first vehicle, having a first set of capabilities, and a second vehicle having a second set of capabilities that is different from the first set;
   a plan dependency identifier configured to analyze a mission plan and identify mission constraints of the mission plan;
   an alert formulator configured to determine whether a part of the mission plan is threatened by loss of a first vehicle of the team of vehicles;
   a contingency manager configured to continuously review execution of the mission plan for violations of the mission constraints, the contingency manager being configured to map tasks of the mission plan into an hierarchy such that a given task in a first layer of the hierarchy of tasks can have at least one component task in a second layer of the hierarchy; and
   a mission planner configured to receive alerts from said alert formulator and modify only parts of the mission plan necessitated by the alerts, such that the mission planner generates a new mission plan comprising modified tasks and unmodified tasks.

7. The system as set forth in claim 6, the contingency manager including a capability assessor configured to identify the sets of capacities associated with the team of vehicles and to provide the identified sets of capacities to the contingency manager.

8. The system as set forth in claim 6, the system further comprising a platform execution manager configured to simulate a planned mission through tasking of a set of the team of vehicles.

9. The system as set forth in claim 8, wherein the platform execution manager is configured to provide a realistic simulation model to evaluate candidate plans from the mission planner and provide feedback to an operator for plan rehearsal.

10. The system as set forth in claim 6 wherein the contingency manager receives a common relevant operational picture of an operational area and the determination if one of the loss of a first vehicle of the team of vehicles and the loss of a capacity associated with the first vehicle threatens an execution of the mission plan is made according to the common relevant operational picture.

* * * * *